sion Conference and Exhibit, Jul. 10-12, 1995, San Diego, California.

United States Patent
Dornburg

(10) Patent No.: US 11,009,166 B2
(45) Date of Patent: May 18, 2021

(54) LOCKING COUPLING WITH MULTIPLE COUPLING UNITS

(71) Applicant: Technische Universität Berlin, Berlin (DE)

(72) Inventor: Lars Dornburg, Berlin (DE)

(73) Assignee: Technische Universität Berlin, Berlin (DE)

( * ) Notice: Subject to any disclaimer, the term of this patent is extended or adjusted under 35 U.S.C. 154(b) by 199 days.

(21) Appl. No.: 16/317,866

(22) PCT Filed: Jul. 12, 2017

(86) PCT No.: PCT/EP2017/067618
§ 371 (c)(1),
(2) Date: Jan. 15, 2019

(87) PCT Pub. No.: WO2018/015256
PCT Pub. Date: Jan. 25, 2018

(65) Prior Publication Data
US 2020/0347977 A1    Nov. 5, 2020

(30) Foreign Application Priority Data
Jul. 18, 2016   (DE) ............... 10 2016 213 094.3

(51) Int. Cl.
*F16L 37/30* (2006.01)
*F16L 37/373* (2006.01)
(Continued)

(52) U.S. Cl.
CPC ............. *F16L 37/373* (2013.01); *F16L 37/32* (2013.01); *F16L 37/34* (2013.01); *B64G 1/1078* (2013.01); *B64G 1/402* (2013.01); *B64G 1/646* (2013.01)

(58) Field of Classification Search
CPC .......... F16K 37/30; F16K 37/32; F16K 37/34; F16L 37/30; F16L 37/32; F16L 37/34; F16L 37/373
(Continued)

(56) References Cited

U.S. PATENT DOCUMENTS 3,168,335 A * 2/1965 Sumption ............... F16L 37/32
                                                              285/70
4,362,326 A * 12/1982 F'Geppert ............ F16L 37/35
                                                             285/315
(Continued)

FOREIGN PATENT DOCUMENTS

CN      101672400 A      3/2010
CN      102829273 A     12/2012
(Continued)

OTHER PUBLICATIONS

Farrell, Jr., "Fluid Quick Disconnect Coupling for International Space Station Alpha", 31st AIAA/ASME/SAE/ASEE Joint Propulsion Conference and Exhibit, Jul. 10-12, 1995, San Diego, California.
(Continued)

*Primary Examiner* — Kevin L Lee
(74) *Attorney, Agent, or Firm* — The Webb Law Firm

(57) ABSTRACT

The invention relates to a locking coupling including a first coupling unit and a second coupling unit, which in each case extend along a longitudinal axis and are designed to be identical. Each coupling unit includes a valve unit and a locking unit. The first and the second valve unit are designed to form a fluid connection between the first and the second coupling unit, and the first and the second locking unit are designed to connect the first coupling unit and the second coupling unit mechanically to one another. The first coupling unit includes an actuating element, by actuation of which the first and the second coupling unit can be mechanically
(Continued)

connected to one another via the first and the second locking unit and can be fluidically connected to one another via the first and the second valve unit.

19 Claims, 11 Drawing Sheets

(51) Int. Cl.
　　*F16L 37/32* 　　(2006.01)
　　*F16L 37/34* 　　(2006.01)
　　*B64G 1/10* 　　(2006.01)
　　*B64G 1/40* 　　(2006.01)
　　*B64G 1/64* 　　(2006.01)
(58) Field of Classification Search
　　USPC .................................... 137/614.03–614.05
　　See application file for complete search history.

(56) References Cited

U.S. PATENT DOCUMENTS

| | | | |
|---|---|---|---|
| 4,664,149 A | 5/1987 | Fremy | |
| 4,982,736 A * | 1/1991 | Schneider | A61F 7/02 137/614.04 |
| 5,090,448 A * | 2/1992 | Truchet | F16L 37/23 137/614.03 |
| 6,146,374 A * | 11/2000 | Erskine et al. | A61M 5/16831 604/533 |
| 6,702,508 B2 | 3/2004 | Simons et al. | |

FOREIGN PATENT DOCUMENTS

| | | |
|---|---|---|
| DE | 102004056642 A1 | 6/2006 |
| DE | 102009023449 A1 | 12/2010 |
| EP | 0202798 A2 | 11/1986 |
| EP | 1225356 A1 | 7/2002 |
| EP | 1776530 B1 | 11/2010 |
| FR | 1377215 | 9/1964 |
| GB | 1164126 | 9/1969 |

OTHER PUBLICATIONS

Ziaei, "New Computational Concepts for Dimensioning of Standardized Polygonal Profiles as Form—Closured Shaft and Hub Connections", VDI-Berichte, 2007, pp. 41-55, No. 2004.

"Satellite Services System Servicing Equipment Catalogue", NASA, 1988, Lyndon B. Johnson Space Center, Houston, Texas.

* cited by examiner

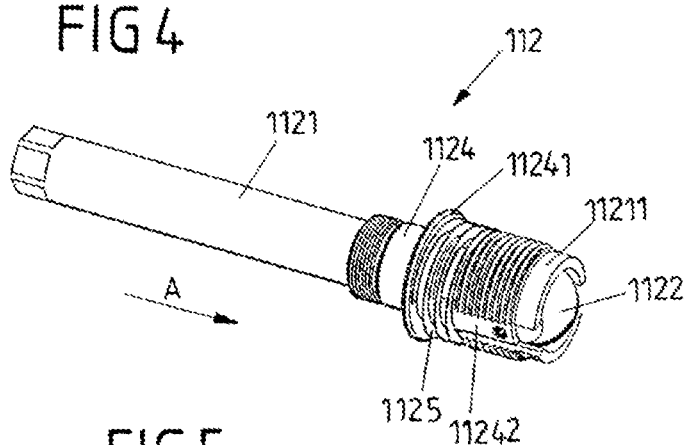
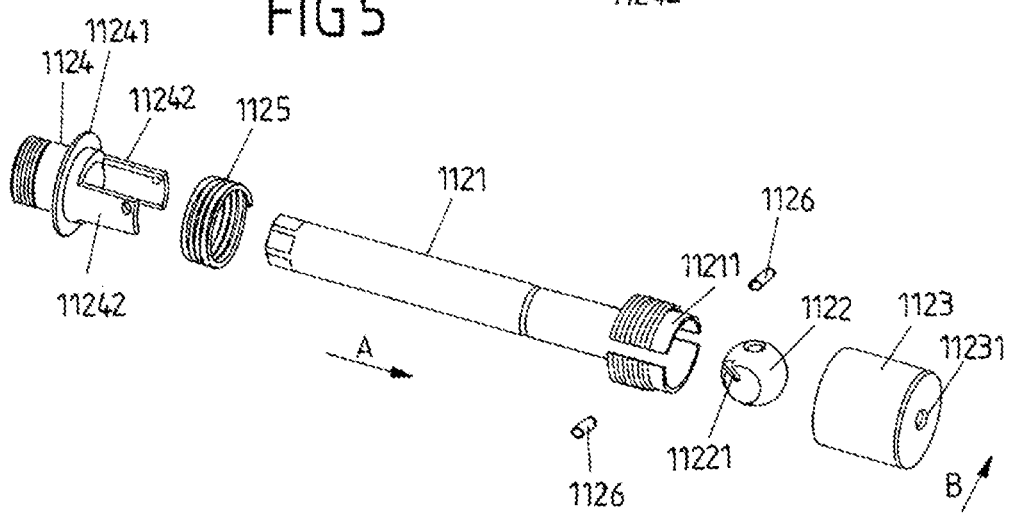
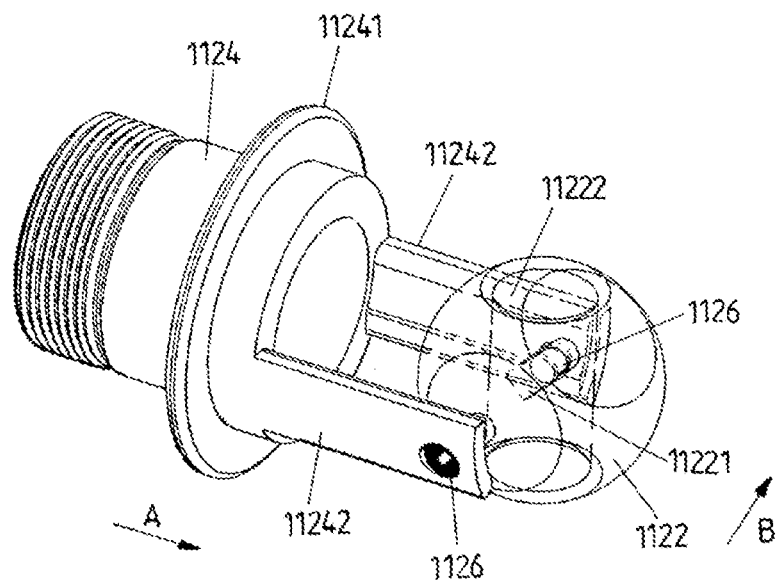

LOCKING COUPLING WITH MULTIPLE COUPLING UNITS

CROSS-REFERENCE TO RELATED APPLICATIONS

This application is the United States national phase of International Application No. PCT/EP2017/067618 filed Jul. 12, 2017, and claims priority to German Patent Application No. 10 2016 213 094.3 filed Jul. 18, 2016, the disclosures of which are hereby incorporated in their entirety by reference.

BACKGROUND OF THE INVENTION

Field of the Invention

The disclosure relates to a locking coupling. The locking coupling is provided for producing a fluidic connection between two components in order to transfer a fluid (liquid or gaseous medium) between the two components.

Description of Related Art

The locking coupling can thus be used, for example, in the case of fuel transfer and refueling of satellites. The drive system of a satellite, in this case, can be modularized into a fuel tank module, a fuel transfer module and a drive module. A locking coupling can be used to produce a releasable connection between said modules.

In this case, the locking coupling is to lock and fluidically seal each of the modules in the decoupled state and to enable a leak-free connection between the modules for directionally-independent fluid transfer in the coupled state.

SUMMARY OF THE INVENTION

The object underlying the proposed solution is to create a locking coupling which meets said criteria.

Said object is achieved by a locking coupling with features as described herein.

The locking coupling accordingly includes a first coupling unit and a second coupling unit which each extend along a longitudinal axis. To produce a fluidic connection between the two locking units, they can be aligned, for example, one behind the other in such a manner that the longitudinal axes thereof form a common axis. The first coupling unit includes a first valve unit and a first locking unit, whilst the second coupling unit includes a second valve unit and a second locking unit. The first and the second valve units are realized to form a fluidic connection between the first and the second coupling units. The first and the second valve units can be connected/are connected accordingly to fluid-conducting units of the modules which are to be connected together. The first and the second locking units are realized to connect the first coupling unit and the second coupling unit together mechanically.

The locking coupling is characterized in that the second coupling unit is realized identically to the first coupling unit and the first coupling unit includes an actuating element, as a result of the actuation of which the first and the second coupling units are connectable together mechanically by means of the first and the second locking units and fluidically by means of the first and the second valve units. In this case, as a result of actuating the actuating element, first of all the mechanical connection can be produced and then, as a result of sustained actuation of the actuating element, the fluidic connection can be produced. In this case, the actuating element can be actuated in the same manner to produce the mechanical and the fluidic connection.

This ensures that, as a result of actuating one single element, it is possible to produce and to release again both a mechanical and a fluidic connection between the modules to be connected together. This simplifies the handling of the locking coupling.

Insofar as both coupling units are realized identically (androgynously), both the first and the second coupling units comprise the described actuating element such that the actuating element of the first or second coupling unit is able to be chosen to produce the mechanical and fluidic connection between the two coupling units. The coupling unit, the actuating element of which is actuated, is then the active coupling unit, whilst the other is the passive coupling unit. The two identical coupling units are therefore to be seen as androgynous. An androgynous coupling unit can interact with a further androgynous coupling unit, an exclusively active coupling unit or an exclusively passive coupling unit.

In the case of an androgynous (or at least functionally identical) design of the two coupling units, as a result of moving the fluid line of the first (second) coupling unit out of the housing of the first (second) locking unit and into the second (first) coupling unit, a force is able to be exerted onto the fluid line of the second (first) coupling unit. As a result, the fluid line of the second (first) coupling unit can be displaced along the longitudinal axis in relation to the slider of the second (first) coupling unit, as a result of which a rotation of the valve ball of the second (first) coupling unit can be brought about. Depending on the initial position of the valve balls of the two coupling units in the non-coupled state, a fluid connection between the fluid lines of the first and second coupling units can consequently be produced. In order to uncouple the two coupling units again, the actuating element of the first (second) coupling unit can be actuated in the opposite direction.

According to an embodiment, the first valve unit can be arranged inside the first locking unit, part of the first valve unit being displaceable along the longitudinal axis relative to part of the first closure unit. As a result, part of the first valve unit can be moved out of the first locking unit and toward the second valve unit for the purpose of producing the fluidic connection.

The actuating element can thus be part of the first locking unit and be mounted so as to be rotatable about the longitudinal axis. The actuating element can be actuated, for example, by rotation. In this case, rotation of the actuating element in one direction can result in producing the mechanical and the fluidic connection and rotation in the opposite direction can result in releasing the mechanical and the fluidic connection. The actuating element, in this case, can interact in such a manner with at least part of the first locking unit that said part is moved as a result of actuation of the actuating element (for example along the longitudinal axis), as a result of which a mechanical connection to the second locking unit can be produced. In addition, the actuating element can interact in such a manner with the valve unit (or parts thereof) that a fluid connection between the first and the second coupling units can be produced.

According to an embodiment, the first locking unit includes a drive sleeve, which is connected non-rotatably to the actuating element, and a locking sleeve which is connected non-rotatably to the drive sleeve. Consequently, a movement (rotation) of the actuating element can be transmitted via the drive sleeve to the locking sleeve. The actuating element and the locking sleeve can thus each be realized as a hub, both of which are pushed onto the drive sleeve which forms a shaft. To produce a non-rotatable connection between the actuating element and the drive sleeve, on the one hand, and between the drive sleeve and the locking sleeve, on the other hand, the drive sleeve can comprise a profile on the outside surface which is not rotationally symmetrical about the longitudinal axis. The actuating element and the locking sleeve can correspondingly comprise a complementary profile on the inside surfaces. Said profile, for example, can be a polygonal profile (with or without rounded corners), a P4C profile, a key shaft profile or an involute tooth profile.

The first locking unit can also comprise a (sleeve-shaped) housing. The housing can be rotatably mounted on the drive sleeve. Consequently, the actuating element (and the locking sleeve), which is (are) connected to the drive sleeve so as to be rotatable, is rotatable in relation to the housing. The drive sleeve can be realized as a shaft, whilst the actuating element, the locking sleeve and the housing are each realized as a hub and are mounted on the shaft. In this case, the individual elements of the first locking unit can be arranged, when viewed from inside to outside, in the following order: drive sleeve, locking sleeve, housing and actuating element.

The (sleeve-shaped) housing can comprise a thread on its inside surface and the locking sleeve can comprise a thread on its outside surface. In this case, the thread of the housing and the thread of the locking sleeve can be realized complementarily, and in particular screwed into one another. As a result of the screw-connection, the thread of the housing and the thread of the locking sleeve can interact in such a manner that a rotation of the actuating element not only results in a rotation, but also in a translational movement of the locking sleeve along the longitudinal axis. Consequently, as a result of actuation (rotation) of the actuating element, the locking sleeve can be displaced linearly along the longitudinal axis with reference to the housing. This ensures, for example, that the locking sleeve is moved out of the housing of the first locking unit and consequently, for the purposes of producing a mechanical connection between the first coupling unit and the second coupling unit, is able to interact with the second coupling unit, in particular with the second locking unit.

According to an embodiment, the first valve unit can include a fluid line with a receiving means for a valve ball. The fluid line can be realized in tubular manner. The fluid line can comprise an inside diameter which is smaller than or equal to the diameter of the valve ball. The receiving means can comprise a cavity which has the form of the valve ball (of a ball or of a ball segment). In this case, the valve ball can be rotatable in the receiving means. In addition, the first valve unit can include a slider, wherein the slider is displaceable along the longitudinal axis relative to the fluid line. In this case, the slider (forming a hub) can be pushed onto the fluid line (forming a shaft). The slider can be realized, for example, in a substantially sleeve-shaped manner.

The slider can comprise at least one arm which extends substantially along the longitudinal axis and projects into the receiving means for the valve ball. The at least one arm and the valve ball can interact in such a manner that a movement of the slider relative to the fluid line along the longitudinal axis brings about a rotation of the valve ball in the receiving means. The rotation, in this case, can be effected about an axis which is substantially perpendicular to the longitudinal axis. A connection between the at least one arm and the valve ball can be provided for this purpose, where a projection (for example in the form of a pin) projects into a recess. The recess can be realized in an elongated, in particular rectilinear manner. The projection can be provided on the at least one arm and the (elongated) recess can be realized in the surface of the valve ball, and vice versa. As an alternative to this, a separate element (for example in the form of a pin) can engage in the recess on one side and in a recess formed complementarily to the pin on the other side. The recess formed complementarily to the pin can be provided on the at least one arm, and the (elongated) recess can be realized in the surface of the valve ball, and vice versa. For realizing a connection between the valve ball and the at least one arm, which is movable along the longitudinal axis, the surface of the valve ball can be flattened and comprise a flat surface in portions. The flat surface can extend parallel to the longitudinal axis such that the at least one arm is able to slide along the flat surface. The elongated recess or the pin can be arranged in/on the flat surface. The pin can be arranged on an axis which extends perpendicular to the longitudinal axis and which is at a spacing from a central axis of the valve ball which runs through the mid-point of the valve ball. The elongated recess can be arranged in a plane which extends parallel to the longitudinal axis, the elongated recess, however, enclosing an angle with the longitudinal axis. This can ensure that as a result of a linear movement of the pin along the longitudinal axis, the valve ball rotates about a central axis which runs through the mid-point of the valve ball and perpendicular to the longitudinal axis.

According to an embodiment, the valve ball can comprise a through opening which is realized, for example, as a substantially cylindrical channel. Said channel can be realized coaxially with a central axis of the valve ball which runs through the mid-point of the valve ball. In this case, the axis, about which the valve ball is rotatable, can enclose an angle (for example substantially) 90° with the axis of the through-opening.

The through-opening in the valve ball of the first valve unit is provided to produce a fluid connection between the fluid line of the first valve unit and the second coupling unit. In this case, the fluid can flow from the first into the second coupling unit, or vice versa. In order to be able to produce and interrupt the fluid connection in a targeted manner, the valve ball can be movable in the receiving means between a first position, in which the fluid line is fully open as a result of the through opening, and a second position in which the fluid line is completely closed by the valve ball. The alignment of the through-opening differs in the first and in the second position. Whilst in the first position the through-opening is fully traversable by fluid, the through-opening in the second position is not traversable by fluid. In particular, the through-opening in the first position (forming an extension of the fluid line) can be aligned along the longitudinal axis and in the second position enclose an angle (for example substantially 90°) with the longitudinal axis. Depending on the diameter of the through-opening, the angle in the second position can also be less than 90°.

The receiving means for the valve ball can be provided at any point of the fluid line at which the valve balls can influence (produce or interrupt) the fluid connection. The receiving means can thus divide the fluid line into two portions. As an alternative to this, the receiving means can be provided on an end of the fluid line, the end being the end, for example, facing the second coupling unit. Insofar as the receiving means is provided on an end of the fluid line, a valve cap, which interacts with the receiving means in such a manner that the valve ball can be held in the receiving means, can be provided.

According to an embodiment, a means can be provided for transmitting the translational movement of the locking sleeve to the slider. Consequently, as a result of actuating the actuating element it is not only possible to displace the locking sleeve and produce a mechanical connection between the first and the second coupling units, but also the slide (which is part of the first valve unit) can be displaced along the longitudinal axis with reference to the fluid line. As a result of the displacement of the slider, (as already mentioned further above), the valve ball is set into rotation, which can result in the production of a fluid connection.

The means for transmitting the translational movement of the locking sleeve to the slider can be provided on the locking sleeve and/or on the slider. Thus, for example, the locking sleeve and the slider can each comprise a projection, the projections extending in opposite directions and substantially transversely to the longitudinal axis. As a result of moving the locking sleeve along the longitudinal axis, the projections can be moved to abut. The projections, in this case, can be arranged in such a manner with respect to one another that the projection of the locking sleeve is able to move initially toward the projection of the slider as a result of the movement of the locking sleeve along the longitudinal axis, the slider not being entrained. The translational movement of the locking sleeve cannot be transmitted to the slide until the projections are moved to abut. This consequently ensures that the movement of the slide is time-lagged in relation to the movement of the locking sleeve so that, for example, first of all a mechanical connection is produced between the first and the second coupling units (by means of the locking sleeve being displaced along the longitudinal axis) and then a fluidic connection (by means of rotation of the valve ball which is brought about by the movement of the slider).

According to a further embodiment, a means is provided for transmitting the translational movement of the locking sleeve to the fluid line, wherein the means (or part of the means) is provided on the locking sleeve and/or on an element of the valve unit (on the fluid line itself or on another element of the valve unit which is fixedly connected to the fluid line). Said means can include a projection on the locking sleeve and a projection on the fluid line, the projections extending in opposite directions and substantially transversely to the longitudinal axis. The projection of the fluid line can be formed, for example, by the receiving means for the valve ball. As an alternative to the projection of the fluid line, a projection can be formed by the valve cap which is fixedly connected to the fluid line. The means for transmitting the translational movement of the locking sleeve to the fluid line can also include a (compression) spring which is arranged, (when viewed along the longitudinal axis) between the projection of the locking sleeve and the projection of the fluid line (or of the valve cap) and is deformable (compressible) along the longitudinal axis.

The projection of the locking sleeve, which is part of the means for transmitting the translational movement of the locking sleeve to the fluid line, can be identical to the projection of the closure sleeve which is part of the means to transmit the translational movement of the locking sleeve to the slider. As an alternative to this, the locking sleeve can comprise two projections which, when viewed along the longitudinal axis, are arranged, for example, one behind another.

Insofar as the locking sleeve comprises two projections, the spring can be arranged directly between the one projection of the locking sleeve and the projection of the fluid line (or of the valve cap).

As a result of moving the locking sleeve along the longitudinal axis in the direction of the projection of the fluid line, the spring can be compressed, as a result of which part of the force can be transmitted to the fluid line and the fluid line can also move along the longitudinal axis.

Insofar as the locking sleeve comprises one single projection which is both part of the means for transmitting the translational movement of the locking sleeve to the fluid line and part of the means for transmitting the translational movement of the locking sleeve to the slider, the spring can be arranged between the projection of the slider and the projection of the fluid line (or of the valve cap). In this case, the projection of the sliders (when viewed along the longitudinal axis) can be arranged between the projection of the locking sleeve and the spring. As soon as the projection of the locking sleeve abuts against the projection of the slider and the slider is moved with the locking sleeve along the longitudinal axis, the projection of the slider can exert a force onto the spring which can result in compression of the spring and in a movement of the fluid line along the longitudinal axis.

So that the spring is actually compressed, additionally necessary is a counter force which acts on the spring and is directed in opposition to the direction of movement (of the slider and) of the locking sleeve. Said counter force can be exerted on the spring, for example, by the projection of the fluid line or of the valve cap. The counter force can stem, for example, from the second coupling unit which abuts against the first valve unit of the first coupling unit with its second valve unit during the coupling operation of the two coupling units. The valve cap of the first valve unit can thus abut, for example, against a valve cap of the second valve unit.

The fluid line can accordingly be displaced along the longitudinal axis as a result of actuation of the actuating element in such a manner that it for example projects out of the housing of the first locking unit and into the second coupling unit. Depending on the design of the second coupling unit, the movement of the fluid line of the first coupling unit can be utilized for producing the fluidic connection between the first and the second coupling units.

In the case of a different design of the two coupling units, the second coupling unit can comprise a second locking unit which is realized to interact with the locking sleeve of the first locking unit for the purpose of producing a mechanical connection between the two coupling units. In addition, the second coupling unit can comprise a second valve unit which is realized to interact with the first valve unit of the first coupling unit for the purpose of producing a fluidic connection between the two coupling units. The remaining features of the second coupling unit can differ from those of the first coupling unit. A different design can be, for example, a functionally different design of the valve and/or locking units or, in particular, a "male" or "female" design of the (otherwise functionally identical) coupling units.

According to an embodiment, the actuating element is manually actuatable. In this case, the outside surface of the first coupling unit (or of part of the actuating element and of the housing) can be designed in such a manner that slipping off can be avoided. For example, the outside surface can comprise a knurled profile or a rubber coating.

According to an alternative embodiment, the actuating element can be actuatable by means of a drive unit. The drive unit can include, in particular, a worm gear. As an alternative to this, the drive unit can include a hollow shaft motor or torque motor which can be (directly) pushable onto the actuating element axially. In place of a worm gear, a conventional spur gear, bevel gear or planetary gear can be used (the actuating element forming the so-called sun gear). Finally, the actuating element can also be driven by means of a belt drive as drive unit.

Fastening means can be provided for this purpose to connect the actuating element and the housing securely to the drive unit.

According to an embodiment, it can be provided that with the first and the second coupling units in the fluidically coupled state, the first valve unit abuts against the second valve unit. For this purpose, the first and the second valve units can each comprise a free end which is delimited, for example, by an end face which extends substantially perpendicularly to the longitudinal axis. In this case, the end faces can abut flatly against one another. The end faces can each comprise an opening, the openings of the two end faces lying on an axis in the coupled state in order to enable a fluidic connection between the two coupling units. In particular, the first valve unit (or the valve unit of the active coupling unit in the case of androgynous coupling units) can exert a force (directed in the direction of the second valve unit) onto the second valve unit (or the valve unit of the passive coupling unit) along the longitudinal axis.

To seal the transition between the valve units with the coupling units in the coupled state, it can be provided that the locking sleeve of the first locking unit (or the locking unit of the active coupling unit in the case of androgynous coupling units) surrounds the first and the second valve unit at least in the region of the transition between the valve units and comprises, on its inside surface facing the valve units, sealing means which are arranged in the coupled state, on one side, between the locking sleeve and the first valve unit and, on the other side, between the locking sleeve and the second valve unit.

At least one sealing means, which is arranged between the valve ball and the receiving means, can be additionally provided. Said at least one sealing means can serve for sealing the fluid line in relation to the surrounding area when the coupling units are uncoupled and the valve ball is in the second position. To this end, the receiving means can comprise a corresponding groove in which the at least one sealing means is arranged. In this case, the at least one sealing means can be arranged in such a manner that it does not contact the through-opening when the valve ball is in the second position. The at least one sealing means can be realized, for example, in a ring-shaped manner.

Insofar as the valve ball is held in the receiving means by means of a valve cap, at least one sealing means, which is arranged between the valve ball and the valve cap (for example in a groove provided in the valve cap), can be provided. In this case, at least one sealing means can be arranged between the valve ball and the receiving means and at least one sealing means between the valve ball and the valve cap. When the coupling units are coupled and the valve balls are in the first position, the through-openings of the valve balls can consequently be sealed in relation to the surrounding area.

According to an embodiment, with the first and the second coupling units in the fluidically coupled state, the valve unit of the active coupling unit (for example the first valve unit) can project along the longitudinal axis into the passive coupling unit (for example the second coupling unit).

BRIEF DESCRIPTION OF THE DRAWINGS

The solution is explained in more detail below by way of exemplary embodiments in conjunction with the drawings, in which:

FIG. 4 shows a perspective representation of a valve unit (without valve cap) of the first coupling unit from FIG. 1;

FIG. 5 shows an exploded representation of the valve unit from FIG. 4 additionally with valve cap;

FIG. 6 shows a perspective representation of the valve unit components—slider and valve ball—from FIGS. 4 and 5, the ball being arranged in a second position;

DESCRIPTION OF THE INVENTION

Figure 1:
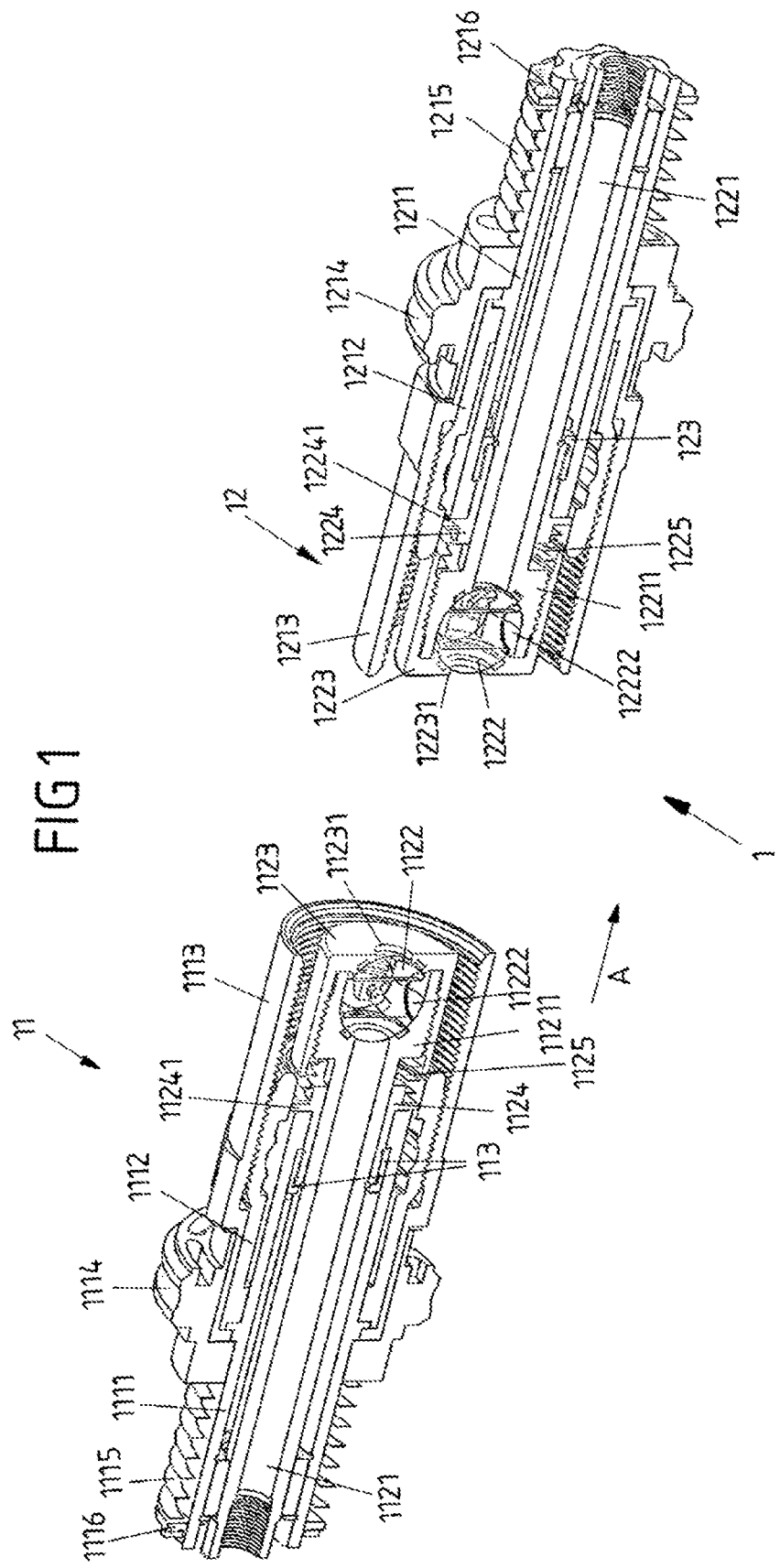
FIG. 1 shows a cross section through a locking coupling in the non-coupled state with a first coupling unit and a second coupling unit according to an embodiment.

FIG. 1 shows a schematic representation of a cross section along a longitudinal axis A through a locking coupling 1 according to an embodiment in the non-coupled state. The locking coupling 1 includes two units which are couplable together, the first coupling unit 11 and the second coupling unit 12. In the embodiment in FIG. 1, the first and the second coupling units 11, 12 are designed identically (form, method of operation). In this case, the two coupling units 11, 12 are arranged in a mirror-symmetrical manner to one another, the mirror plane being aligned substantially perpendicularly to the longitudinal axis A. In spite of the identical design of the two coupling units, the one coupling unit functions as an active coupling unit, the other coupling unit as a passive coupling unit, as will be explained subsequently. The two coupling units 11, 12 from FIG. 1 are consequently to be seen as androgynous. As an alternative to this, the coupling units can also be realized variously (with regard to form and/or method of operation).

The first coupling unit 11 includes a first locking unit 111 and a first valve unit 112, and the second coupling unit 12 includes a second locking unit 121 and a second valve unit 122. In this case, the first locking unit 111 and the second locking unit 121 are designed identically, as are the first valve unit 112 and the second valve unit 122. In the non-coupled state, the first valve unit 112 is arranged in the first locking unit 111 and the second valve unit 122 in the second locking unit 121.

Figure 2:
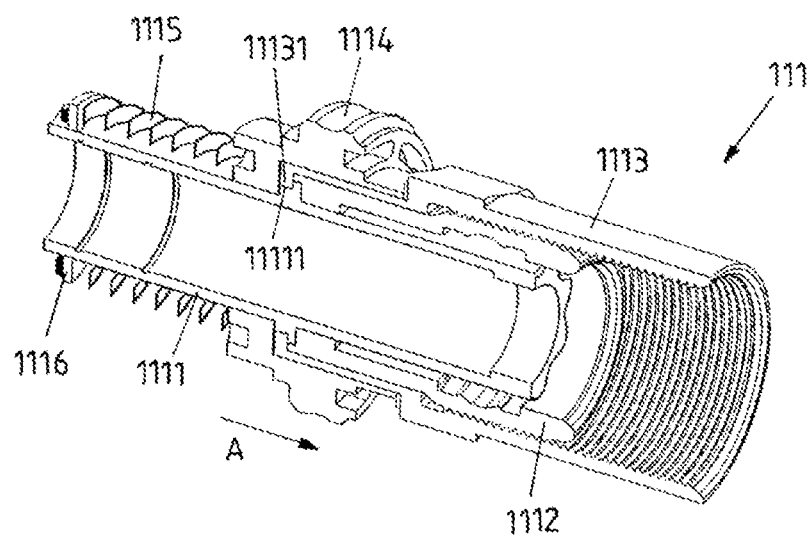
FIG. 2 shows a sectional representation of a locking unit of the first coupling unit from FIG. 1.

Representing the two locking units 111, 121, FIG. 2 shows a sectional representation of the first locking unit 111 (along the longitudinal axis A) to illustrate the design. The first locking unit 111 includes a drive sleeve 1111, a locking sleeve 1112, a housing 1113 and an actuating element 1114. The drive sleeve 1111, the locking sleeve 1112 and the housing 1113 are realized in a sleeve-shaped (cylindrical) manner and extend concentrically about the longitudinal axis A. The actuating element 1114 is realized as a drive wheel which extends in portions around the housing 1113 and is accessible to a user. The actuating element 1114 is connected non-rotatably to the drive sleeve 1111. The drive sleeve 1111 is connected non-rotatably to the locking sleeve 1112. For that purpose, the actuating element 1114 (as hub) and the locking sleeve 1112 (as hub) are pushed onto the drive sleeve 1111 (as shaft). To produce a non-rotatable connection, the drive sleeve 1111, in portions, comprises a profile on the outside surface and the locking sleeve 1112 and the actuating element 1114, in portions, each comprise a complementary profile on the inside surface, all of which are non-rotationally symmetrical about the longitudinal axis A.

Figure 3:
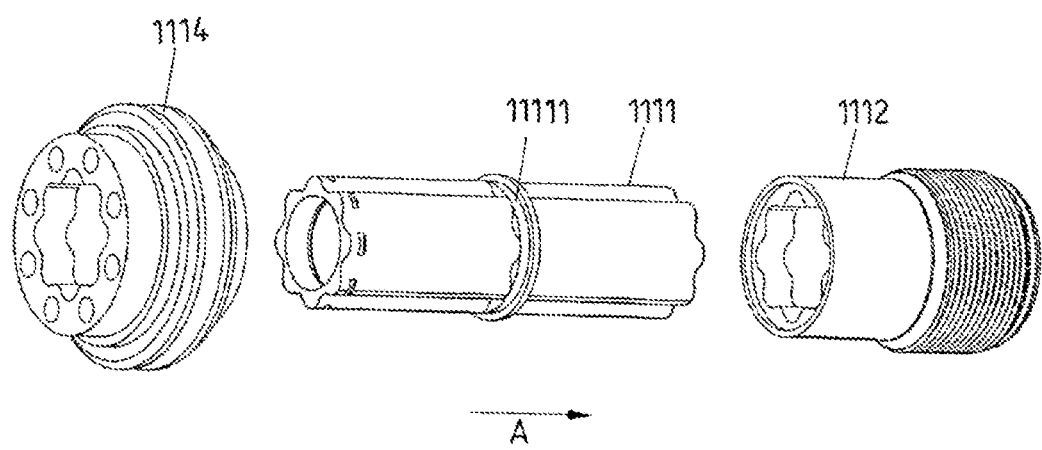
FIG. 3 shows an exploded representation of the locking unit components—actuating element, drive sleeve and locking sleeve—of the locking unit from FIG. 2.

To illustrate the profile, FIG. 3 shows an exploded representation of the elements of the first locking unit 111 which are connected together non-rotatably, namely the actuating element 1114, the drive sleeve 1111 and the locking sleeve 1112. In said embodiment, the profile includes a polygonal profile. A non-rotatable connection can be achieved as a result of the polygonal profile.

The actuating element 1114 is mounted on the housing 1113 so as to be rotatable. For this purpose, the actuating element 1114 (on its inside surface) and the housing 1113 (on its outside surface) each comprise a portion with a (circular) profile that is rotationally symmetrical about the longitudinal axis A.

The locking sleeve 1112 is additionally mounted in the housing 1113 so as to be rotatable about the longitudinal axis A. For this purpose, the locking sleeve 1112 (on its outside surface) and the housing 1113 (on its inside surface) each comprise a portion with a (circular) profile that is rotationally symmetrical about the longitudinal axis A, said portions interacting for the rotatable bearing arrangement. In addition, the locking sleeve 1112 comprises a thread (in portions) on its outside surface. A complementary thread is realized (in portions) on the inside surface of the housing 1113. The housing 1113 and the locking sleeve 1112 interact by means of the internal or external thread. The threads extend substantially along the longitudinal axis A.

If the actuating element 1114 is actuated (rotated about the longitudinal axis A), the drive sleeve 1111 is also made to rotate (about the longitudinal axis A). The latter entrains the locking sleeve 1112. On account of the thread, the rotation of the drive sleeve 1111, however, is translated into a screwing movement (rotation and translation) of the locking sleeve 1112. A rotation of the actuating element 1114 accordingly results in a screwing movement of the locking sleeve 1112 along the longitudinal axis A inside the housing 1113. Depending on the direction of rotation of the actuating element 1114 (clockwise or anti-clockwise), the locking sleeve 1112 can be screwed out of the housing 1113 or into the housing 1113. In order to delimit the movement of the locking sleeve 1112 inside the housing 1113 in one direction (namely away from the second coupling unit 12), the housing 1113 comprises a projection 11131 on a first axial end. In the fully screwed-in state, the locking sleeve 1112 abuts against said projection 11131 by way of a first end (FIG. 2). At the same time, the locking sleeve 1112 abuts against a projection 11111 of the drive sleeve 1111 by way of the first end. In this case, (in the fully screwed-in state), the housing 1113 projects along the longitudinal axis A by way of its second (free) axial end, which is situated opposite the first axial end, beyond the second (free) end of the locking sleeve 1112 (in the direction of the second coupling unit 12). The free end of the housing 1113 makes it possible for the locking sleeve 1112 to move out of the housing 1113 beyond the second axial end. When the locking sleeve 1112 projects out of the housing 1113 until the profiles of the housing 1113 and of the locking sleeve 1112, which are rotationally symmetrical about the longitudinal axis A, no longer interact, the locking sleeve 1112 is thus rotatably mounted on the housing 1113 by means of the thread of the housing 1113 and the locking sleeve 1112.

Figure 8A:
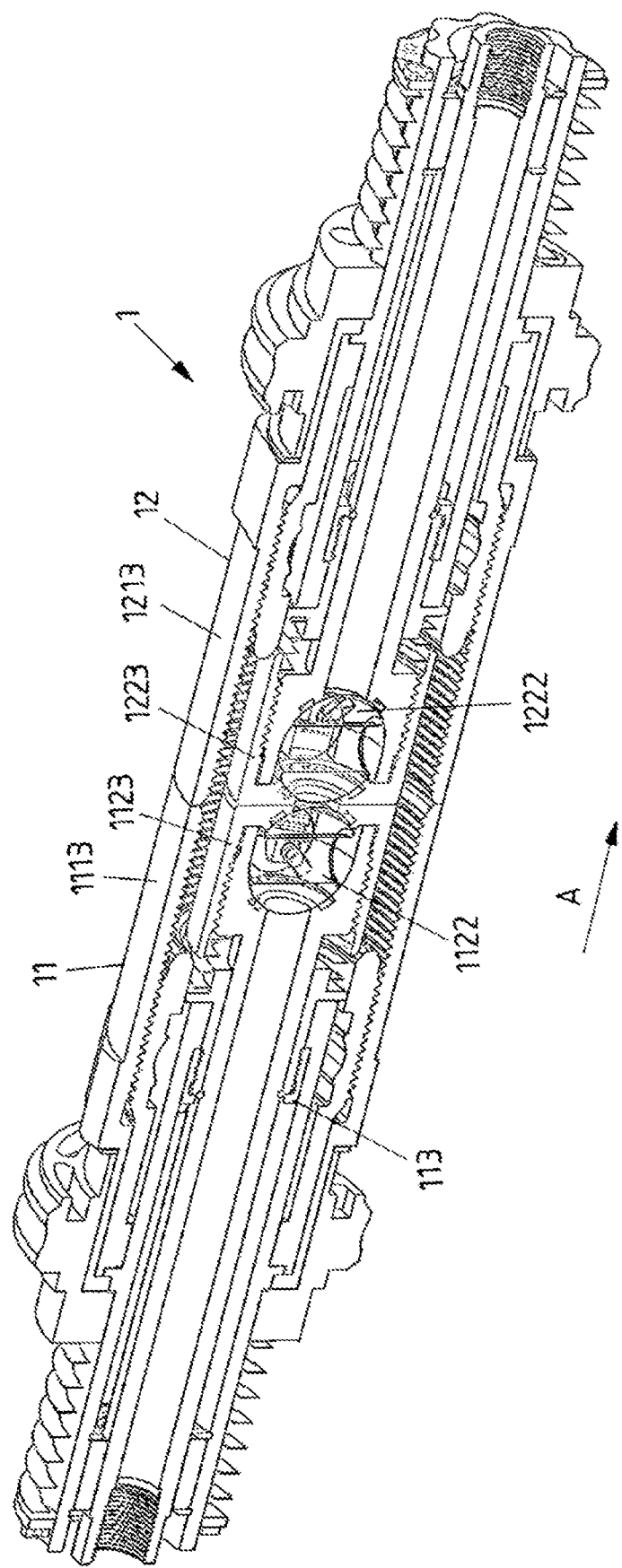
FIGS. 8*a*-8*e* show five snapshots of the locking coupling from FIG. 1 to illustrate the coupling operation.
Figure 8B:
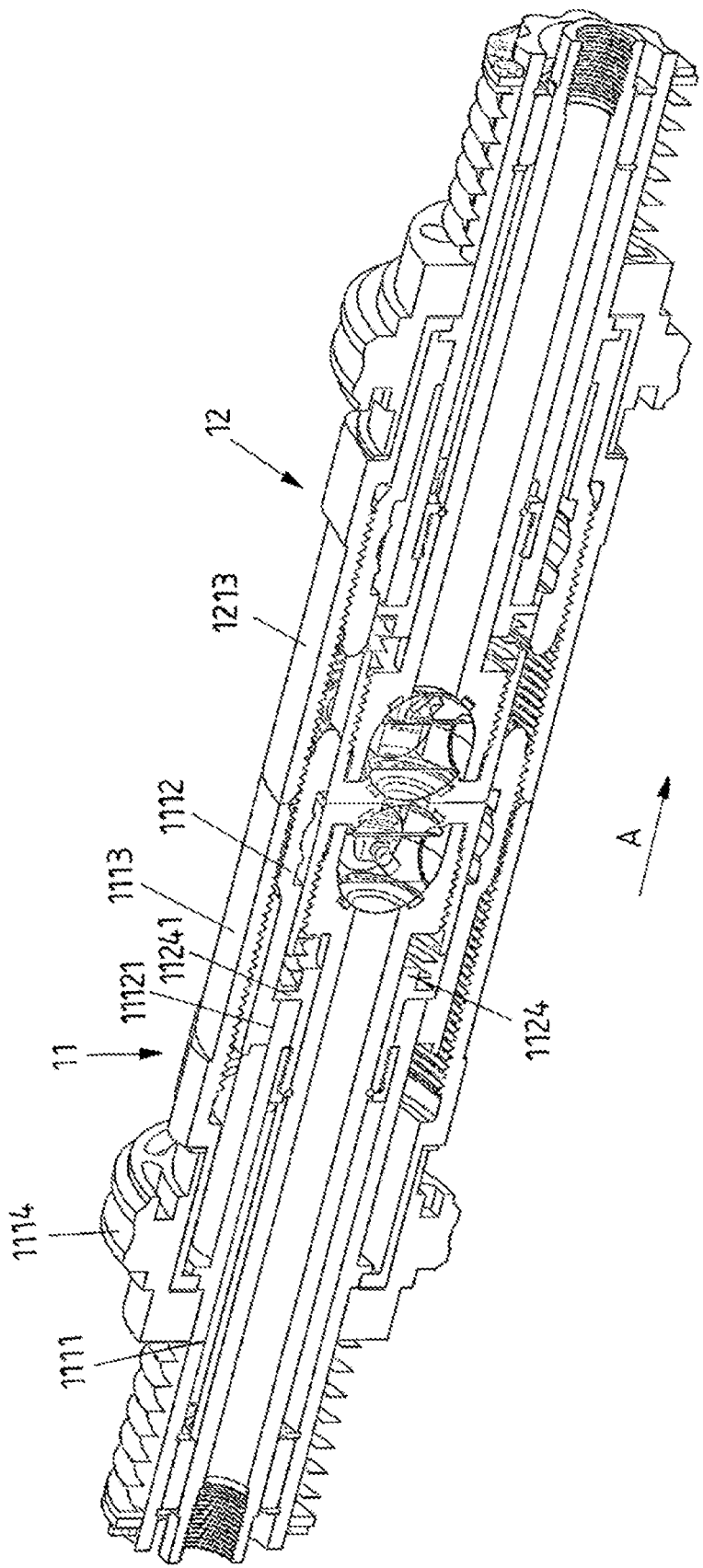

The housing 1113 (when viewed along the longitudinal axis A) is longer than the locking sleeve 1112. Consequently, the locking sleeve 1112 is able, in principle, to assume three different positions in relation to the housing 1113: a) the free end of the housing 1113 can project beyond the free end of the locking sleeve 1112 (FIG. 1); the free end of the housing 1113 and the free end of the locking sleeve 1112 can close off flush with one another (FIG. 8a); c) the free end of the locking sleeve 1112 can project beyond the free end of the housing 1113 (FIG. 8b). The possibility to assume position a) results in the first coupling unit 11 being able to be used as a passive coupling unit, a locking sleeve of another (active) coupling unit being able to project into the housing 1113 thereof. The possibility to assume position c) results in the first coupling unit 11 being able to be used as an active coupling unit, the locking sleeve 1112 of which can project into the housing of another (passive) coupling unit. The first coupling unit 11 (and the second coupling unit 12, which is identical to the first coupling unit 11) from FIG. 1 is consequently to be seen as androgynous.

In addition, a wave spring 1115 is pushed onto the drive sleeve 1111 which is arranged axially between a spring pressure disk 1116 and the actuating element 1114 (or the group which includes the actuating element 1114, the locking sleeve 1112 and the housing 1113). The spring pressure disk 1116 is arranged fixedly on the drive sleeve 1111. The wave spring 1115 is compressible along the longitudinal axis A. For example, the wave spring 1115 is compressed during the coupling operation of the two coupling units 11, 12 (FIGS. 8a to 8e). When uncoupling the two coupling units 11, 12, the wave spring is urged into its equilibrium position and supports the uncoupling operation. In the equilibrium position (in the uncoupled state), the wave spring 1115 holds the drive sleeve 1111 axially in a defined position with reference to the actuating element 1114 (to the locking sleeve 1112 and the housing 1113). The wave spring 1115, in this case, presses a projection of the actuating element 1114 in the direction of the projection 11131 of the housing 1113 and of the projection 11111 of the drive sleeve 1111, which, in turn, press against a projection 11121 of the locking sleeve 1112. The projection of the actuating element 1114, in this case, can press directly against the projection 11131 of the housing 1113 and the projection 11111 of the drive sleeve 1111 or indirectly, for example by means of a slide ring which can be inserted in order to avoid friction. As a result of the threads which are realized in the housing 1113 and the locking sleeve 1112, a counter force acts on the wave spring 1115 such that axial displacement of the actuating element 1114 (or of the group which includes the actuating element 1114, the locking sleeve 1112 and the housing 1113) by the wave spring 1115 is prevented.

Representing the two valve units 112, 122, the first valve unit 112 is shown in perspective in FIG. 4 and in an exploded representation in FIG. 5 to illustrate the design. The first valve unit 112 includes, as central element, a tubular fluid line 1121 which extends along the longitudinal axis A. The fluid line 1121 is connectable to a fluid-conducting system by means of its first axial end (shown on the left in FIG. 4). On the second axial end, which is situated opposite the first axial end (shown on the right in FIG. 4), the fluid line 1121 comprises a receiving means 11211 for a valve ball 1122. The receiving means 11211 is realized substantially as a hollow cylinder, the lateral surface of which comprises, for example, two interruptions which each extend along the longitudinal axis A and divide the lateral surface into two shells. As an alternative to this, just one or more than two interruptions are able to be provided. According to a further alternative, the lateral surface can be realized in a continuous manner (without interruptions). The valve ball serves for producing and interrupting a fluidic connection between the fluid line 1121 of the first coupling unit 11 and a fluid line of the second coupling unit. The valve ball comprises a diameter which is greater than the inside diameter of the fluid line 1121. The valve ball 1122 is arranged in the receiving means 11211. A valve cap 1123, which is fastened to the receiving means (FIG. 5), is provided in order to hold the valve ball 1122 in the receiving means. For the purpose of clarity, the valve cap is not shown in FIG. 4. In the exemplary embodiment shown in FIGS. 4 and 5, a screw connection is provided for fastening the valve cap 1123 to the receiving means 11211. For this purpose, the receiving means 11211 comprises a thread on its outside surface. A complementary thread is realized on the inside surface of the valve cap 1123. The valve cap 1123 comprises an opening 11231 through which fluid (with the valve cap 1123 in the correctly arranged state) can flow into the receiving means 11211 or out of the receiving means 11211. The opening 11231 is realized in a surface of the valve cap 1123 which extends substantially perpendicularly to the longitudinal axis A. For example, the opening 11231 is arranged coaxially with the fluid line 1121.

The first valve unit 112 additionally comprises a slider 1124 which is pushed onto the fluid line 1121. In this case, the slider 1124 is displaceable in relation to the fluid line 1121 along the longitudinal axis A. The slider 1124 comprises a projection 11241 which extends substantially perpendicularly to the longitudinal axis A. A wave spring 1125 is provided between the projection 11241 and the receiving means 11211. The wave spring 1125 is compressible along the longitudinal axis A and holds the slider 1124 in a defined position axially with reference to the fluid line 1121 (with reference to the receiving means 11211 and the valve ball 1122 arranged in the receiving means 11211) insofar as the wave spring 1125 is in the equilibrium state. The wave spring 1125 also serves for the purpose of transmitting a translational movement of the slider 1124 to the fluid line 1121 along the longitudinal axis A in the direction of the receiving means 11211.

The slider 1124 additionally comprises two arms 11242 which extend along the longitudinal axis A. The two arms 11242 project axially into the receiving means 11211 through the two interruptions in the lateral surface of the receiving means 11211. Insofar as the lateral surface of the receiving means 11211 is realized in a continuous manner (without interruptions), two through-openings are provided in an end face of the receiving means 11211 which is directed to the first axial end of the fluid line 1121, through which end face the two arms 11242 project axially into the receiving means 11211. The arms 11242 are arranged in a mirror-symmetrical manner, the longitudinal axis A lying in the mirror plane. Two pins 1126 are provided in order to produce a connection between the arms 11242 and the valve ball 1122, each pin 1126 projecting in each case through an arm 11242 and an interruption in the lateral surface of the receiving means 11211 into the receiving means 11211. Insofar as no interruption is provided in the lateral surface of the receiving means 11211, corresponding openings can be provided in the receiving means 11211 to receive the pins 1126. In this case, the pins 1126 are arranged on an axis B which extends substantially perpendicularly to the longitudinal axis A. The axis B extends additionally (independently of the relative position of slider 1124 and valve ball 1122) offset in parallel to a central axis of the valve ball 1122 which runs through the mid-point of the valve ball 1122. In the embodiment from FIG. 5, the pins 1126 are shown as elements that are realized separately from the slider 1124 and are only used when the arms 11242 of the slider 1124 project as intended into the receiving means 11211. As an alternative to this, the pins 1126 can be fastened on the arms 11242 of the slider 1124 before the arms 11242 are introduced into the receiving means 11211. In this case, the form of the through-openings in the receiving means 11211, through which the arms 11242 project into the receiving means 11211, is to be correspondingly adapted.

Figure 7:
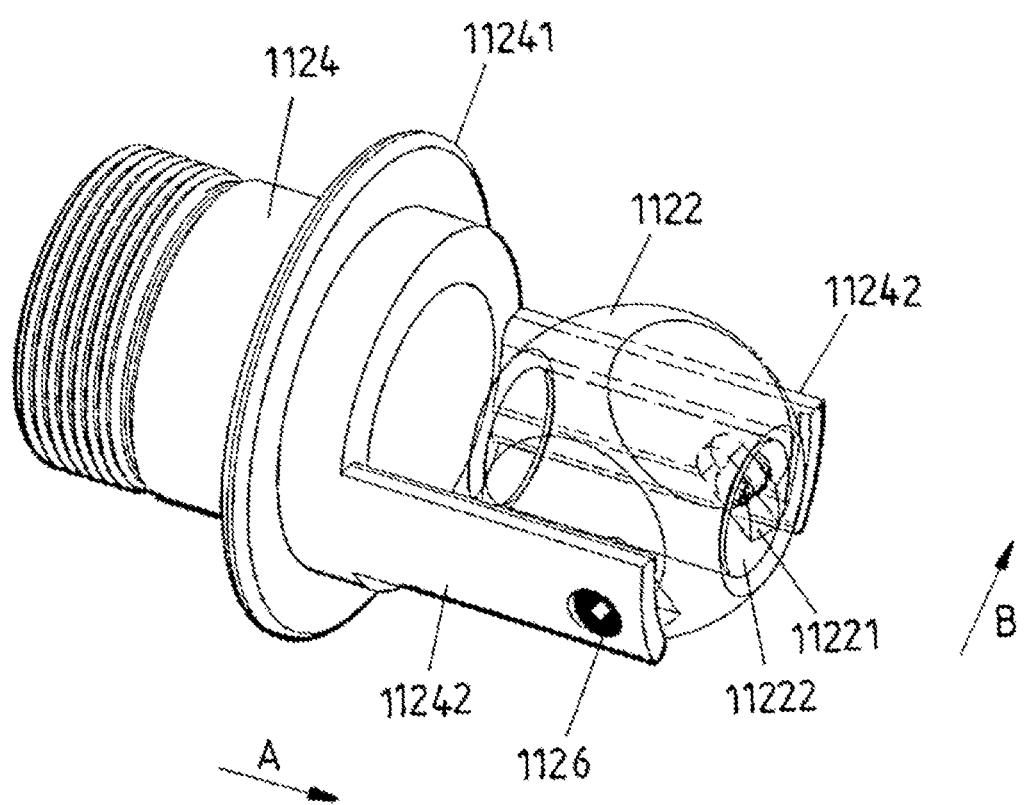
FIG. 7 shows a perspective representation of the valve unit components—slider and valve ball—from FIGS. 4 and 5, the ball being arranged in a first position.

FIGS. 6 and 7 show how the pins 1126 interact with the valve ball 1122. The valve ball 1122 comprises two elongated (rectilinear) recesses 11221 for this purpose into which the pins 1126 project as intended. The valve ball 1122 is flattened on two oppositely situated sides, each elongated recess 11221 being realized in each case in one of the two flat surfaces (formed by the flattening). The flat surfaces extend substantially parallel to the longitudinal axis A. As a result of the parallel offset of the axis B, on which the pins 1126 are arranged, to a central axis of the valve ball 1122 which runs through the mid-point of the valve ball 1122, it can be achieved that a movement of the slider 1124 (and consequently of the pins 1126) relative to the fluid line 1121 (and consequently to the valve ball 1122 in the receiving means 11211) along the longitudinal axis A brings about a rotation of the valve ball 1122 in the receiving means 11211 about a central axis of the valve ball 1122 which runs through the mid-point of the valve ball 1122 and perpendicularly to the longitudinal axis A.

The valve ball 1122 comprises a through-opening 11222 which extends, for example, in a cylindrical manner through the entire valve ball 1122. In this case, the through-opening 11222 (or the inlet and outlet thereof) is arranged in a plane which extends substantially perpendicularly to the axis B. As a result of the movement of the slider 1124, the valve ball 1122 is rotatable between a first position, in which the through-opening 11222 extends substantially along the longitudinal axis A, and a second position in which the through-opening 11222 extends substantially perpendicularly to the longitudinal axis A. The rotation is effected about a central axis of the valve ball 1122 which runs through the mid-point of the valve ball 1122 and parallel to the axis B. In the first position, the valve ball 1122 opens the fluid line 1121 fully and enables the production of a fluidic connection to the second valve unit 122 of the second coupling unit 12 (FIG. 7). Depending on the choice of inside diameter of the fluid line 1121 and of the through-opening 11222, the fluid line 1121 is opened fully (inside diameter of the fluid line 1121 is smaller than or equal to the inside diameter of the through opening 11222) or only partially (inside diameter of the fluid line 1121 is greater than the inside diameter of the through opening 11222). In the second position, the valve ball 1122 closes the fluid line 1121 completely and interrupts the fluidic connection to the second valve unit 122 of the second coupling unit 12 (FIG. 6).

With a ball diameter of 23 mm, in order to obtain such a 90° rotation of the valve ball 1122 about a central axis of the valve ball 1122, a linear movement of the slider 1124 along the longitudinal axis A of 7.4 mm is necessary. In this case, the pins 1126, which are arranged on the axis B, are offset from the central axis (parallel to the axis B) of the valve ball 1122 which runs through the mid-point of the valve ball. When the slider 1124 and the valve ball 1122 are arranged in such a manner with respect to one another that the valve ball 1122 is in the first or second position, the offset is +3.7 mm or −3.7 mm from said central axis of the valve ball 1122 along the longitudinal axis A and in each case 3.7 mm from the central axis of the valve ball 1122 perpendicular to the longitudinal axis A and perpendicular to the central axis of the valve ball 1122. The inside diameter of the through-opening 11222, in this case, is 10 mm or less. In order to be able to use a valve ball 1122 with a larger inside diameter of the through-opening 11221 and, in this case, additionally, to enable a 90° rotation of the valve ball 1122, the coupling unit 11 can be resized as a whole or in part (in particular the ball diameter, the dimension of the linear movement of the slider 1124 and the offset of the pin 1126 from the central axis of the valve ball 1122).

To produce a connection between the first valve unit 112 and the first locking unit 111, the slider 1124 of the first valve unit 112 is fastened on the drive sleeve 1111 of the first locking unit 111. To this end, on its outside surface the slider 1124 comprises a thread which interacts with a locking nut 113 (FIG. 8*a* for example). The thread is axially spaced from the projection 11241 of the slider 1124 so that a projection of the drive sleeve 1111 is arrangeable between the locking nut 113 and the projection 11241 of the slider 1124. In this case, the portion of the slider 1124 between the thread and the projection 11241 comprises a rotationally symmetrical outside surface with reference to the longitudinal axis A and the projection of the drive sleeve 1111 comprises a rotationally symmetrical inside surface with reference to the longitudinal axis A such that the drive sleeve 1111 is mounted on the slider 1124 so as to be rotatable. The valve unit 112 is consequently able to rotate about the longitudinal axis A in the locking unit 111. The rotational movement of the actuating element 1114, which is transmissible to the drive sleeve 1111, is consequently not transmitted to the valve unit 112. This is particularly advantageous as the fluid line 1121 (as part of the valve unit 112) is connectable via its first axial end to a fluid-conducting system which could either be damaged by a rotation of the valve unit 112 about the longitudinal axis or would impede a rotation of the valve unit 112 about the longitudinal axis A and consequently a rotation of the actuating element 1114. The projection of the drive sleeve 1111 is intended to be clamped axially between the locking nut 113 and the projection 11241 of the slider 1124. A movement of the slider 1124 along the longitudinal axis A consequently also results in axial displacement of the drive sleeve 1111. As the drive sleeve 1111 is simply non-rotatably connected to the locking sleeve 1112 and the actuating element 1114, the drive sleeve 1111, in this case, is able to be displaced axially with reference to the locking sleeve 1112 and the actuating element 1114.

With reference to FIGS. 8*a* to 8*e*, the manner in which a mechanical and a fluidic connection is produced between the first coupling unit 11 and the second coupling unit 12 from FIG. 1 is described below. As the coupling units 11, 12 are designed identically, corresponding reference symbols are used for identical elements of the two coupling units 11, 12. The reference symbols of the two coupling units differ simply in that they start either with 11 (first coupling unit) or 12 (second coupling unit).

To produce the coupled state, the first and the second coupling units 11, 12 are first of all provided in the starting configuration. In said starting configuration, the valve balls 1122, 1222 are each arranged in the second position and the valve caps 1123, 1223 close off flush with the associated housing 1113, 1213. The first and the second coupling units 11, 12 are arranged one behind the other along the longitudinal axis A in the starting configuration, the coupling units 11, 12 being aligned with respect to one another in such a manner that the valve caps 1123, 1223 face one another. In the example shown, the coupling units 11, 12 are arranged in such a manner that the two valve caps 1123, 1223 and the housing 1113, 1213 abut against one another (FIG. 8*a*).

As an alternative to this, it is also possible to arrange the two coupling units 11, 12 at a distance from one another. In every case, the relative position (distance, rotational angle about the longitudinal axis A) of the two coupling units 11, 12 is to be chosen such that the thread of the two housings 1113, 1213 are in phase such that the thread of the locking sleeve 1112 of the active (first) coupling unit 11 is able to interact both with the thread of the housing 1113 of the active (first) coupling unit 11 and with the thread of the housing 1213 of the passive (second) coupling unit 12. A mechanical device, for example, can be used for positioning in a correct relative position.

The actuating element 1114 of the first coupling unit 11 is then actuated (rotated about the longitudinal axis A). The first coupling unit 11 consequently represents the active coupling unit in the present exemplary embodiment and the second coupling unit represents the passive one. As a result of rotating the actuating element 1114, the drive sleeve 1111 is made to rotate, which in turn entrains the locking sleeve 1112. As the locking sleeve 1112 interacts with the internal thread of the housing 1113 by way of its external thread, the rotation of the drive sleeve 1111 is translated into a screwing movement of the locking sleeve 1112, the locking sleeve 1112 of the first coupling unit 11 moving toward the second coupling unit 12. With sustained actuation of the actuating element, the locking sleeve 1112 finally reaches the free (facing the second coupling unit 12) end of the housing 1113 and projects into the housing 1213 of the second coupling unit 12. In this case, the external thread of the locking sleeve 1112 of the first coupling unit 11 interacts with the internal thread of the housing 1213 of the second coupling unit 12, thereby realizing a mechanical connection between the two coupling units 11, 12 (FIG. 8*b*). The projection 11121 of the locking sleeve 1112, which, together with the projection 11241 of the slider 1124, provides a means for transmitting the translational movement of the locking sleeve 1112 to the slider 1124, has reached the projection 11241 of the slider 1124 in FIG. 8*b*.

Figure 8C:
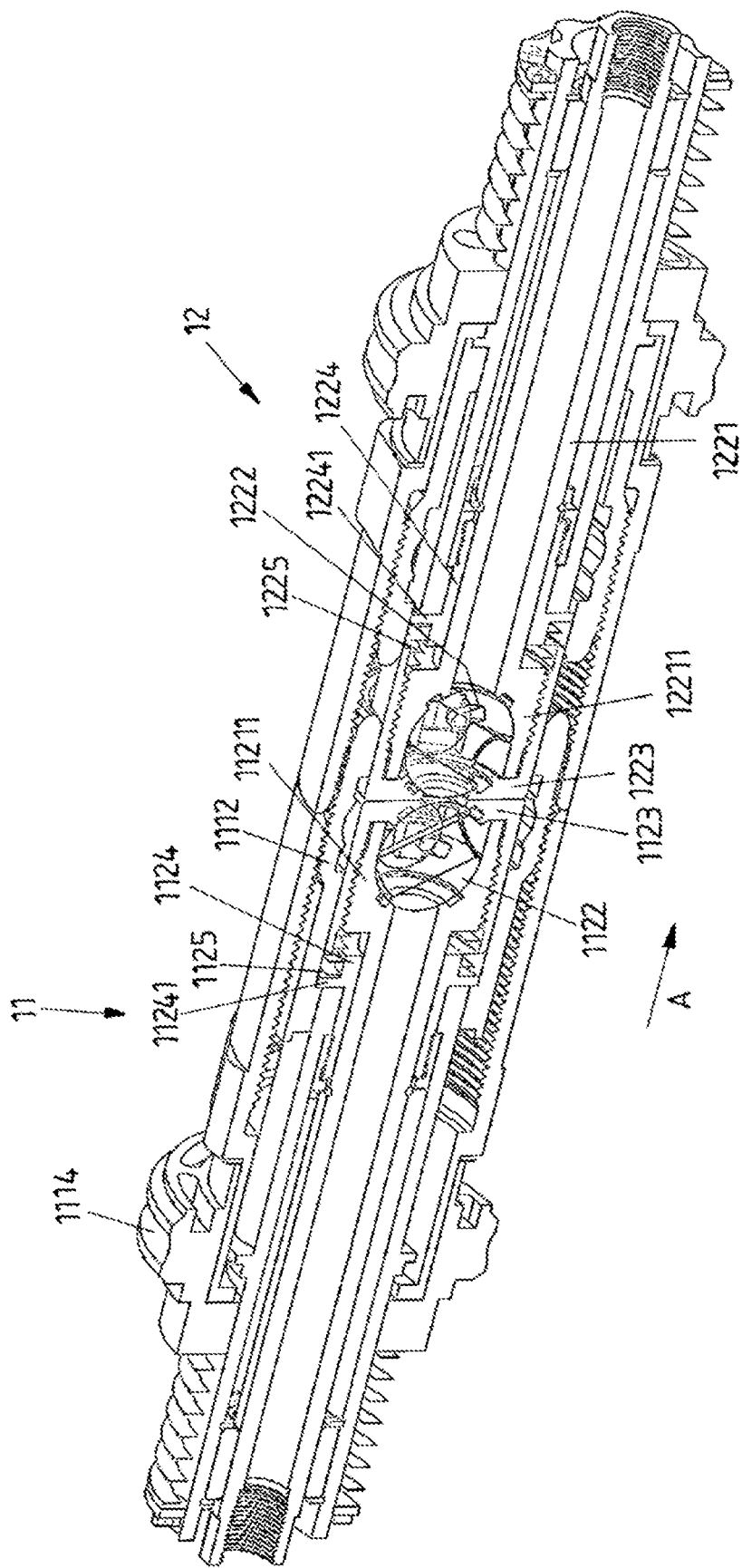
Figure 8D:
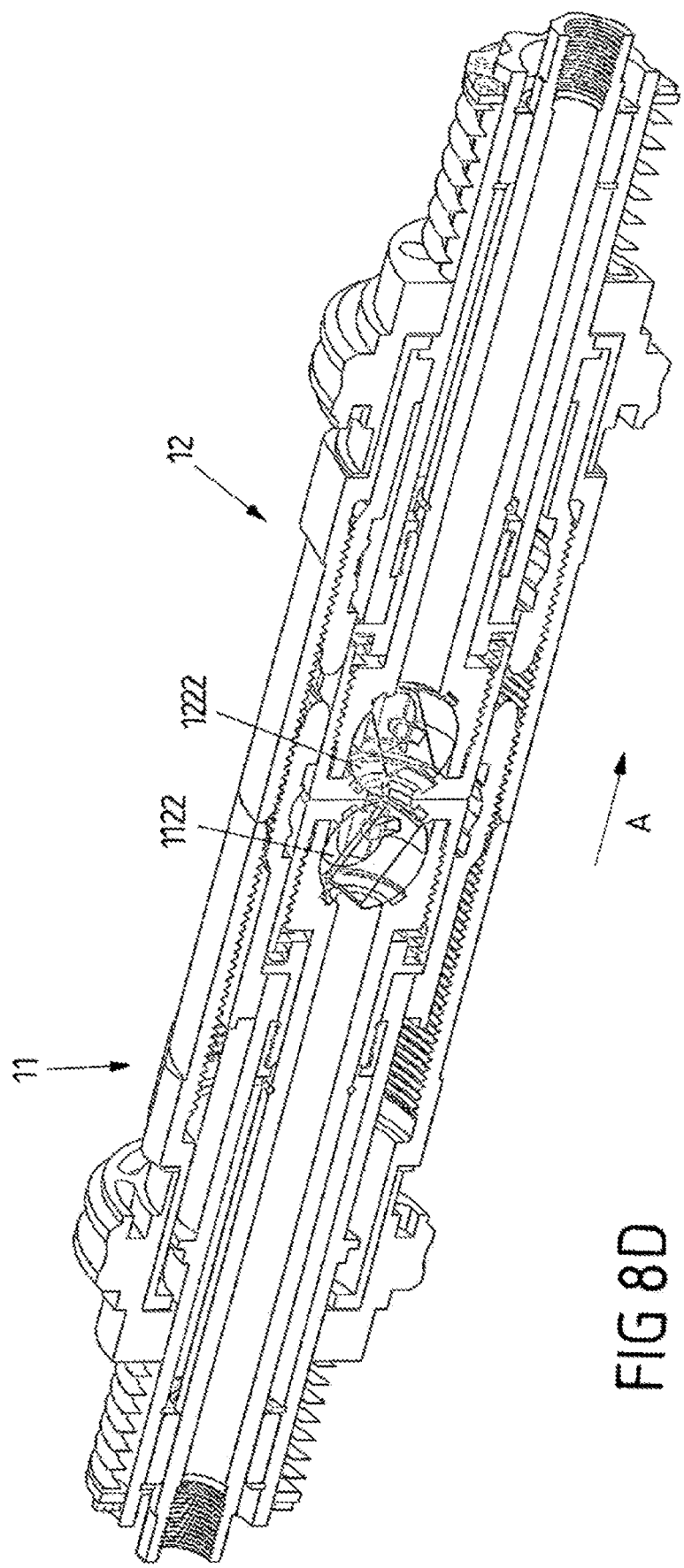

As a result of sustained actuation of the actuating element 1114, the translational movement of the locking sleeve 1112 is transmitted along the longitudinal axis A to the slider 1124. On account of the force opposing the translational movement of the locking sleeve 1112, which acts from the second valve unit 122 on the valve cap 1123 and receiving means 11211 of the first valve unit 112, this results, on the one hand, in the slider 1124 moving inside the first coupling unit 11 with reference to the receiving means 11211, in which the valve ball 1122 is arranged, such that the valve ball 1122 is rotated about a central axis inside the receiving means 11211. In this case, the ball is moved out of the second position and rotated in the direction of the first position (FIG. 8*c*). On the other hand, the linear movement of the slider 1124 of the first coupling unit 11 and the opposing force of the second valve unit 122 result in the wave spring 1125 being compressed between the projection 11241 of the slider 1124 and the receiving means 11211. In this case, part of the force of the slider 1124 is transmitted (by means of the spring 1125) to the receiving means 11211. The wave spring 1125 forms, together with the projection 11241 of the slider 1124, a means for transmitting the translational movement of the locking sleeve 1112 to the fluid line 1121. The receiving means 11211 is fixedly connected to the valve cap 1123 of the first coupling unit 11 which abuts against the valve cap 1223 of the second coupling unit 12. Consequently, the translational movement of the slider 1124 of the first coupling unit 11 is transmitted in part to the valve cap 1223 of the second coupling unit 12. The fluid line 1221 and the valve ball 1222 of the second coupling unit 12 also move with the valve cap 1223 along the longitudinal axis A (in the direction from the first coupling unit 11 to the second coupling unit 12). In this case, the receiving means 12211 with the valve ball 1222 of the second coupling unit 12 slides toward the slider 1224 of the second coupling unit 12. As a result of the relative movement of the valve ball 1222 and the slider 1224, the valve ball 1222 of the second coupling unit 12 is also made to rotate (about a central axis of the valve ball 1222) (FIG. 8*c*). In this case, the wave spring 1225 is also compressed between the projection 12241 of the slider 1224 and the receiving means 12211 of the second coupling unit 12. As soon as the valve caps 1123, 1223 of the first and second valve units 111, 121 contact one another and inside the active coupling unit the translational movement of the locking sleeve 1112 along the longitudinal axis A is transmitted to the slider 1124, both valve balls 1122, 1222 are rotated out of the second position in the direction of the first position.

Figure 8E:
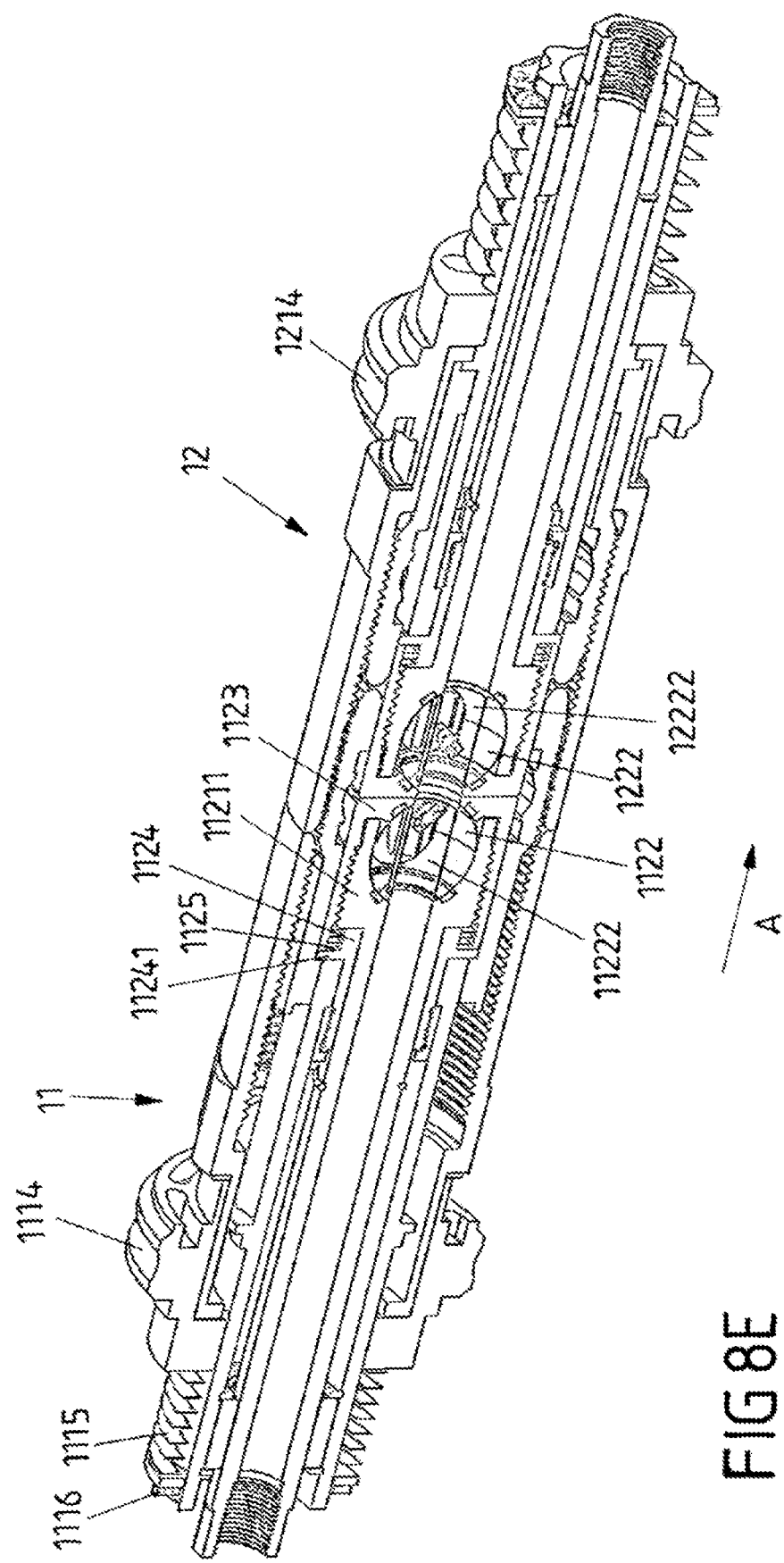

If the actuating element 1114 of the first coupling unit 11 continues to be actuated, the rotation of the valve balls 1122, 1222 is continued (FIG. 8*d*) until the projection 11241 of the slider 1124 of the first coupling unit 11 is prevented from moving. Said situation can occur when the projection 11241 of the slider 1124 reaches the receiving means 11211 or the valve cap 1123 or when the wave spring 1125 has been fully compressed (FIG. 8*e*). In FIG. 8*e*, the valve cap 1123 projects axially in the direction of the slider 1124 beyond the receiving means 11211 and the diameter of the valve cap 1123 is dimensioned such that the slider 1124 is able to be moved to abut with the valve cap 1123. In said example, the projection 11241 of the slider 1124 of the first coupling unit 11 is prevented from moving when the projection 11241 of the slider 1124 reaches the valve cap 1123. The path of the slider 1124 between its starting position (FIG. 8*a*) and its end position (FIG. 8*e*) is dimensioned such that the valve balls 1122, 1222 are in the first position when the slider 1124 has reached its end position. When the two valve balls 1122, 1222 are in the first position, the through-openings 11222, 12222 thereof and consequently the two coupling units 11, 12 are connected fluidically to one another.

In order to reverse the coupling process, the actuating element 1114 of the first coupling unit 11 can be actuated in the opposite direction. In the case of the coupling operation described in FIGS. 8*a* to 8*e*, in the active coupling unit 11, the wave spring 1125 is compressed (moved out of the equilibrium position), on the one side between the projection 11241 of the slider 1124 and the actuating element 1114 and on the other side the wave spring 1115 is compressed between the spring pressure disk 1116 and the actuating element 1114. The spring 1115 is compressed since the slider 1124 is fixedly connected to the drive sleeve 1111 and entrains the drive sleeve 1111. As a result, the spring pressure disk 1116, which is fastened on the drive sleeve, is also entrained and moved toward the actuating element 1114. The wave spring 1115, which is arranged between the spring pressure disk 1116 and the actuating element 1114, is consequently compressed. If the actuating element 1114 is then moved in the opposite direction (for the purpose of uncoupling the two coupling units 11, 12), the force on the springs 1115, 1125 is thus reduced and they (in particular the wave spring 1115) are urged back into their equilibrium position, as a result of which the distance between the spring pressure disk 1116 and the actuating element 1114 is increased and the drive sleeve 1111 is urged in the direction of its starting position (FIG. 8*a*). The wave spring 1115 (and to a lesser extent also the wave spring 1125) consequently supports the uncoupling of the two coupling units 11, 12.

In order to reverse the coupling process, as an alternative to this, the second coupling unit 12 (or the housing 1213 of the second coupling unit 12) can be rotated about the longitudinal axis A in order to release the screw connection between the locking sleeve 1112 of the first coupling unit 11 and the housing 1213 of the second coupling unit 12.

Figure 9:
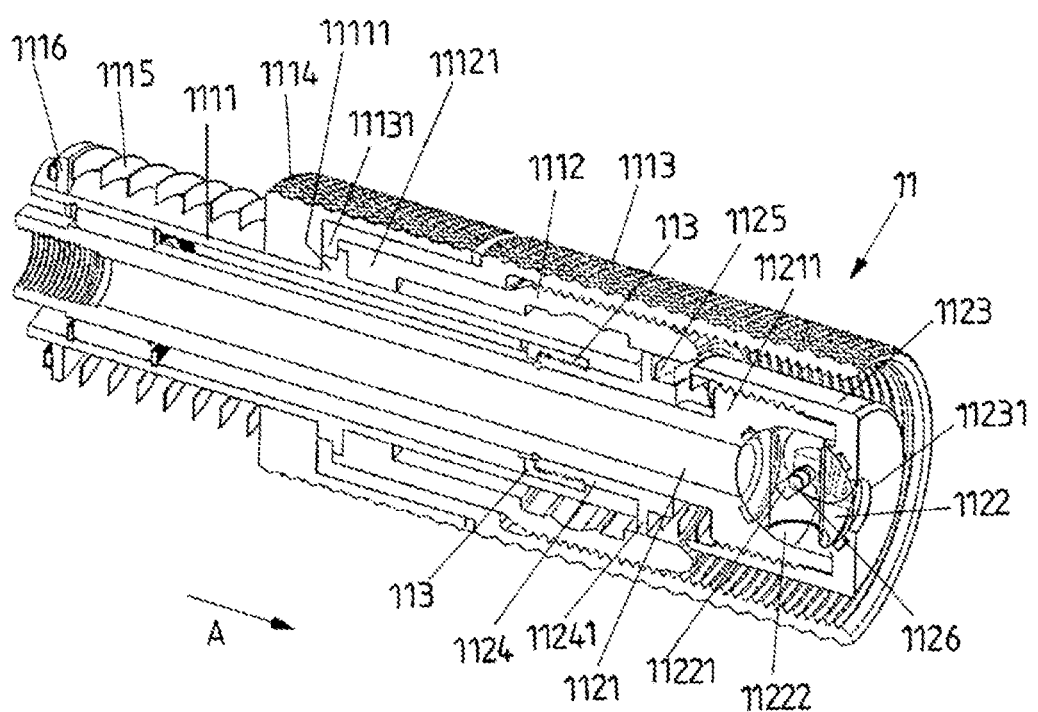
FIG. 9 shows a cross section through a first coupling unit according to a further embodiment.

FIG. 9 shows a first coupling unit 11 according to a further embodiment. This differs from that of FIG. 1 in particular in the design of the outside surface of the actuating element 1114 and of the housing 1113. In the embodiment in FIG. 9, the outside surface comprises a knurled profile in each case, as a result of which said coupling unit 11 is suitable in particular for manual actuation of the actuating element 1114. As a result of the profile, the housing 1113 and the actuating element are able to be gripped securely and the actuating element 1114 operated (almost) without slipping. In the case of the embodiment in FIG. 1, the outside surfaces of the actuating element 1114 and of the housing 1113 are designed in such a manner that the actuating element 1114 is able to be actuated preferably by a drive unit. With regard to the remaining design of the first locking unit 111 and of the first valve unit 112 and with regard to their method of operation, the coupling units from FIGS. 1 and 9 do not differ. A locking coupling 1 can consequently include not only two coupling units according to the embodiment in FIG. 1 or 9 but also a combination of the two embodiments in one locking coupling is possible. In addition, the combination of the coupling unit 11 from FIG. 1 or from FIG. 9 with any other coupling unit is possible insofar as the latter is able to interact with the locking sleeve 1112 and the valve unit 112 of the coupling unit 11.

Figure 10:
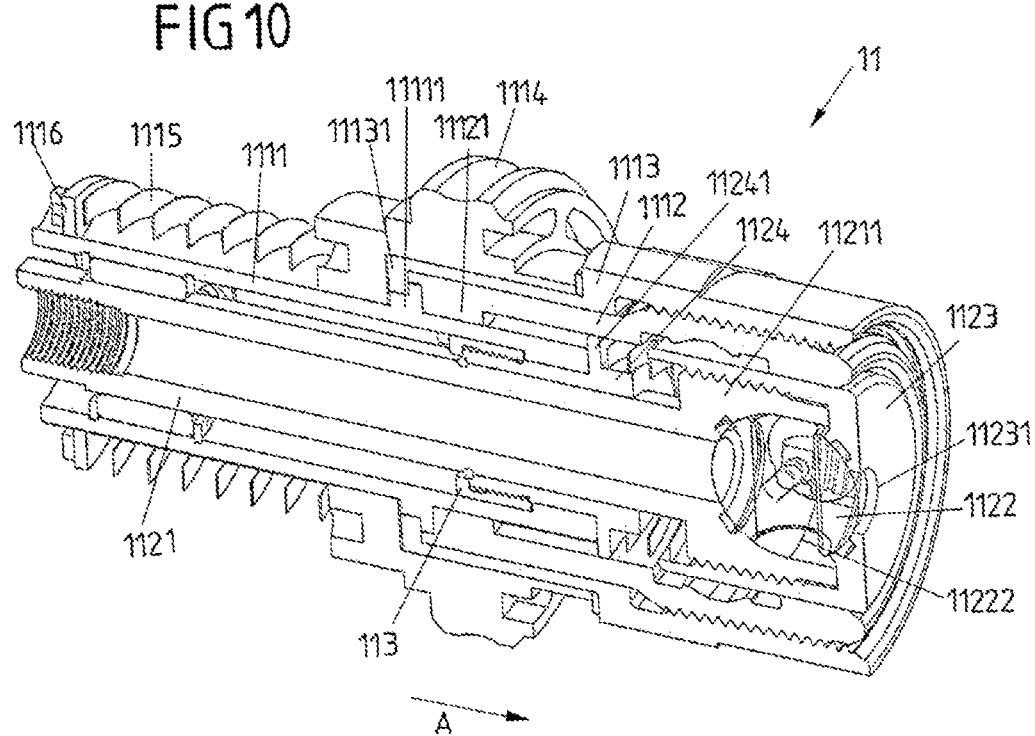
FIG. 10 shows a cross section through a first coupling unit according to a further embodiment.

FIG. 10 shows a first coupling unit 11 according to a further embodiment. This differs from that of FIG. 1 in particular in that the drive sleeve 1111, the housing 1113 and the fluid line 1121 (when viewed along the longitudinal axis A) are shortened in such a manner that the locking sleeve 1112, proceeding from the arrangement shown in FIG. 10 in which the locking sleeve 1112 abuts against the projection 11131 of the housing 1113 by way of a first end and closes off flush with the free end of the housing 1113 by way of a second (free) end, can only be moved out of the housing 1113. The length of the locking sleeve 1112 corresponds substantially to the length of the housing 1113. The remaining design and the method of operation of the coupling unit 11 from FIG. 10 correspond to the design and the method of operation of the coupling units in FIG. 1. As the locking sleeve 1112 cannot be arranged in the housing 1113 in such a manner that the housing 1113 projects axially beyond the locking sleeve 1112 by way of its free second end, the coupling unit 11 from FIG. 10 is able to serve exclusively as an active coupling unit which interacts with a passive coupling unit. The second coupling unit 12 from FIG. 1 or the coupling unit described below from FIG. 11 can serve as a passive coupling unit.

Figure 11:
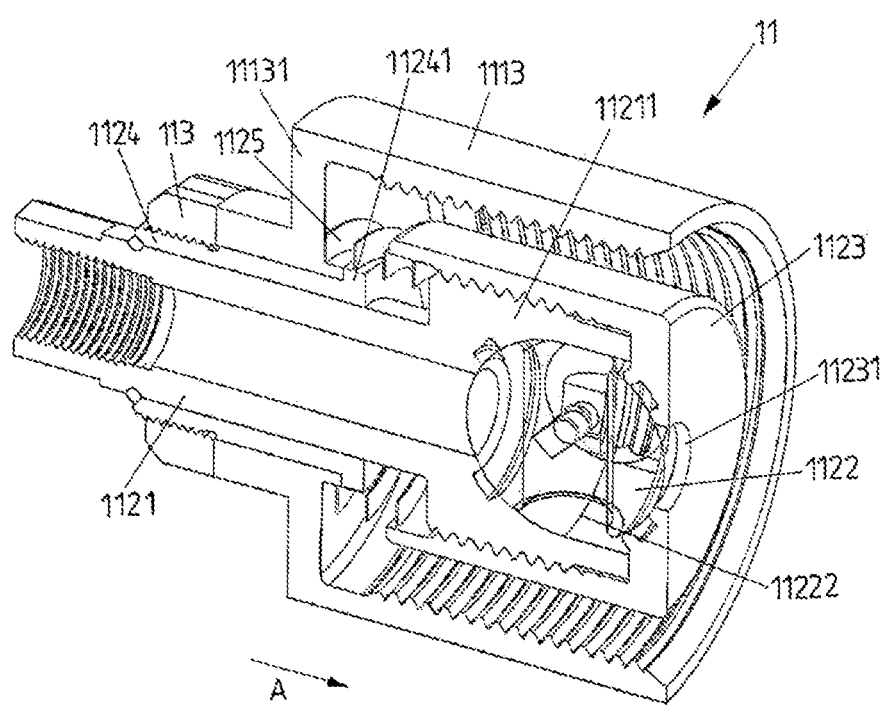
FIG. 11 shows a cross section through a first coupling unit according to a further embodiment.

FIG. 11 shows a first coupling unit 11 according to a further embodiment. This differs from that of FIG. 1 in particular in that the locking unit 111 simply comprises a housing 1113, but no actuating element, no drive sleeve (and consequently no spring pressure disk fastened on the drive sleeve for the bearing arrangement of a wave spring) and no locking sleeve. Consequently, the coupling unit 11 from FIG. 11 can serve exclusively as a passive coupling unit which interacts with an active coupling unit. For example, the second coupling unit 12 from FIG. 1 or the active coupling unit from FIG. 10 can serve as an active coupling unit.

In addition, the fluid line 1121 (compared to the embodiment from FIG. 1) is shortened along the longitudinal axis A. The housing 1113 is held axially between the projection 11241 of the slider 1124 and the locking nut 113 which is screwed onto the slider 1124. The wave spring 1125 is arranged axially between the projection 11131 of the housing 1113 and the receiving means 11211 of the fluid line. The extent of the projection 11241 of the slider 1124 is dimensioned (small) perpendicularly to the longitudinal axis A in such a manner that it does not impede the spring 1125. As an alternative to this, the extent of the projection 11241 of the slider 1124 can be greater perpendicularly to the longitudinal axis A such that the wave spring 1125 is arranged axially between the projection 11241 of the slider 1124 and the receiving means 11211 of the fluid line.

The principle of operation of the coupling units shown in FIGS. 10 and 11 corresponds to that which has been described by way of FIGS. 8*a* to 8*e*.

The invention claimed is:

1. A locking coupling including a first coupling unit and a second coupling unit which each extend along a longitudinal axis, wherein the first coupling unit includes a first valve unit and a first locking unit and the second coupling unit includes a second valve unit and a second locking unit, wherein the first and the second valve units are realized to form a fluidic connection between the first and the second coupling units and wherein the first and the second locking units are realized to connect the first coupling unit and the second coupling unit together mechanically,
wherein
the second coupling unit is realized identically to the first coupling unit and the first coupling unit includes an actuating element, as a result of the actuation of which the first and the second coupling units are connectable together mechanically by means of the first and the second locking units and fluidically by means of the first and the second valve units; and
wherein the first locking unit includes a drive sleeve, which is connected non-rotatably to the actuating element, and includes a locking sleeve which is connected non-rotatably to the drive sleeve.

2. The locking coupling as claimed in claim 1, wherein the first valve unit is arranged inside the first locking unit and in that part of the first valve unit is displaceable relative to part of the first locking unit along the longitudinal axis.

3. The locking coupling as claimed in claim 1, wherein the first locking element includes the actuating element, wherein the actuating element is mounted so as to be rotatable about the longitudinal axis.

4. The locking coupling as claimed in claim 1, wherein the first locking unit comprises a housing with a thread, in that the locking sleeve comprises a complementary thread and the thread of the housing and the thread of the locking sleeve interact in such a manner that a rotation of the actuating element results in a rotational movement and a translational movement of the locking sleeve along the longitudinal axis.

5. The locking coupling as claimed in claim 4, wherein the locking sleeve is movable out of the housing of the first locking unit and is realized to interact with the second coupling unit in order to connect the first coupling unit and the second coupling unit together mechanically.

6. The locking coupling as claimed in claim 1, wherein the first valve unit includes a fluid line with a receiving means for a valve ball and a slider, wherein the slider is displaceable along the longitudinal axis relative to the fluid line.

7. The locking coupling as claimed in claim 6, wherein the slider forms a hub which is displaceable on the fluid line, which forms a shaft.

8. The locking coupling as claimed in claim 6, wherein the slider interacts with the valve ball in such a manner that a movement of the slider relative to the fluid line along the longitudinal axis brings about a rotation of the valve ball in the receiving means.

9. The locking coupling as claimed in claim 6, wherein the valve ball comprises a through opening and the valve ball is movable in the receiving means between a first position, in which the fluid line is fully open as a result of the through opening, and a second position in which the fluid line is completely closed by the valve ball.

10. The locking coupling as claimed in claim 6, wherein the receiving means is provided on an end of the fluid line and in that a valve cap, which holds the valve ball in the receiving means, is provided on said end.

11. The locking coupling as claimed in claim 4, wherein the first valve unit includes a fluid line with a receiving means for a valve ball and a slider, wherein the slider is displaceable along the longitudinal axis relative to the fluid line, and a means is provided for transmitting the translational movement of the locking sleeve to the slider, wherein the means is provided on the locking sleeve and/or on the slider.

12. The locking coupling as claimed in claim 4, wherein the first valve unit includes a fluid line with a receiving means for a valve ball and a slider, wherein the slider is displaceable along the longitudinal axis relative to the fluid line, and a means is provided for transmitting the translational movement of the locking sleeve to the fluid line, wherein the means is provided on the locking sleeve and/or on an element of the valve unit.

13. The locking coupling as claimed in claim 1, wherein the actuating element is actuatable manually or by means of a drive unit.

14. The locking coupling as claimed in claim 1, wherein with the first and the second coupling units in the fluidically coupled state, the first valve unit abuts against the second valve unit.

15. The locking coupling as claimed in claim 1, wherein with the first and the second coupling units in the fluidically coupled state, the first valve unit projects along the longitudinal axis into the second coupling unit or the second valve unit projects along the longitudinal axis into the first coupling unit.

16. The locking coupling as claimed in claim 5, wherein the locking sleeve is moveable out of the housing of the first locking unit and is realized to interact with the second locking unit.

17. The locking coupling as claimed in claim 2, wherein the first locking unit includes a drive sleeve, which is connected non-rotatably to the actuating element, and includes a locking sleeve which is connected non-rotatably to the drive sleeve.

18. The locking coupling as claimed in claim 3, wherein the first locking unit includes a drive sleeve, which is connected non-rotatably to the actuating element, and includes a locking sleeve which is connected non-rotatably to the drive sleeve.

19. The locking coupling as claimed in claim 2, wherein the first valve unit includes a fluid line with a receiving means for a valve ball and a slider, wherein the slider is displaceable along the longitudinal axis relative to the fluid line.

* * * * *